United States Patent [19]

DeVries et al.

[11] 4,231,195

[45] * Nov. 4, 1980

[54] POLYCRYSTALLINE DIAMOND BODY AND PROCESS

[75] Inventors: Robert C. DeVries, Burnt Hills; Minyoung Lee, Schenectady; Lawrence E. Szala, Scotia; Roy E. Tuft, Albany, all of N.Y.

[73] Assignee: General Electric Company, Schenectady, N.Y.

[*] Notice: The portion of the term of this patent subsequent to May 1, 1996, has been disclaimed.

[21] Appl. No.: 42,237

[22] Filed: May 24, 1979

[51] Int. Cl.³ .............................................. B24D 3/02
[52] U.S. Cl. ......................................... 51/307; 51/308
[58] Field of Search ................................. 51/307, 308

[56] References Cited

U.S. PATENT DOCUMENTS

4,124,401 11/1978 Lee et al. ................................. 51/307
4,151,686 5/1979 Lee et al. ................................. 51/307
4,168,957 9/1979 Lee et al. ................................. 51/307

Primary Examiner—Donald J. Arnold
Assistant Examiner—W. Thompson
Attorney, Agent, or Firm—Jane M. Binkowski; James C. Davis, Jr.; Leo I. MaLossi

[57] ABSTRACT

An adherently bonded polycrystalline diamond body is produced by forming a charge composed of a mass of diamond crystals in contact with a mass of eutectiferous silicon-rich alloy wherein the alloy is in contact or in association with hexagonal boron nitride, confining such charge within a reaction chamber, subjecting the confined charge to a pressure of at least 25 kilobars, heating the pressure-maintained charge to a temperature sufficient to melt the alloy and at which no significant graphitization of the diamond occurs whereby the alloy infiltrates through the interstices between the diamond crystals producing said body.

10 Claims, 6 Drawing Figures

POLYCRYSTALLINE DIAMOND BODY AND PROCESS

This invention relates to the production of a polycrystalline diamond body containing a volume fraction of diamonds of at least 90% bonded together by a silicon atom-rich bonding medium.

One of the technical barriers to a high density (high volume of diamond in a body) diamond base compact has been the development of a suitable binder material which will infiltrate the capillaries of a densely packed fine particle size diamond powder. The binder must form a thermally stable strong bond with diamond and should not graphitize or excessively react with the diamond.

The present invention utilizes a eutectiferous silicon-rich alloy which infiltrates well through the capillaries of a compressed mass of diamond crystals and which wets the crystals to form a strong well-infiltrated cemented diamond body. The polycrystalline diamond body produced by the present process is useful as an abrasive, cutting tool, nozzle or other wear-resistant part.

Briefly stated, the present process comprises confining within a reaction chamber a charge composed of solid eutectiferous silicon-rich alloy, or solid components for providing eutectiferous silicon-rich alloy, and a mass of diamond crystals in contact with said mass of solid eutectiferous silicon-rich alloy, or with at least one of said components for providing eutectiferous silicon-rich alloy, and hexagonal boron nitride in contact or in association with said alloy or with at least one of its components, said eutectiferous silicon-rich alloy being composed of silicon and a metal which forms a silicide with said silicon, said hexagonal boron nitride being present in an amount of at least about 5% by weight of the total weight of said mass of diamonds, applying a pressure of at least about 25 kilobars to said confined charge compressing the mass of diamond crystals to a density higher than 90% by volume of the resulting compressed mass of diamond crystals, maintaining said applied pressure, heating the pressure-maintained charge to an infiltration temperature sufficient to melt said alloy and at which no significant graphitization of the diamond occurs whereby said alloy is infiltrated through the interstices between said compressed mass of diamond crystals, said alloy being used in an amount sufficient to fill the interstices of said compressed mass of diamond crystals, said infiltrating silicon-rich alloy encapsulating the surfaces of the compressed diamond crystals reacting with diamond surfaces or any non-diamond elemental carbon producing a carbide which at least in major amount is silicon carbide, ceasing the input of heat into the resulting infiltrated diamond mass, removing said pressure and recovering the resulting polycrystalline diamond body comprised of diamond crystals bonded together by a silicon atom-rich bonding medium wherein the diamond crystals are present in an amount ranging from at least 90% by volume up to about 95% by volume of the total volume of said body.

Those skilled in the art will gain a further and better understanding of the present invention from the detailed description set forth below considered in conjunction with the figures accompanying and forming a part of the specification in which.

The diamond crystals used in the present process can be natural or synthetic. They range in size in largest dimension from about 1 micron to about 1000 microns, and the particular size or sizes used depends largely on the particular packing or density of diamond crystals desired and also on the particular use of the resulting body. For most abrasive applications, for example, diamond crystals no greater than about 60 microns are preferred. Preferably, to maximize the packing of the diamond crystals in the present process, they should be size-graded to contain a range of sizes, i.e. small, medium and large-sized crystals. Preferably, the size-graded crystals range from about 1 micron to about 60 microns, and preferably within this size range, about 60% to about 80% by volume of the total mass of crystals are of the larger sized portion of the range, about 5% to about 10% by volume are of medium size with the balance constituting the small-sized crystals or particles.

Sizing of the diamond crystals is facilitated by the jet-milling of larger diamond crystals. Preferably, the diamond crystals are chemically cleaned to remove any oxides or other impurities from the surface thereof before use in the present process. This may be accomplished by heating the diamond crystals in hydrogen at about 900° C. for about one hour.

In the present invention the eutectiferous silicon-rich alloy, i.e. the term alloy herein including intermetallic compound, is comprised of silicon and a metal, i.e. alloying metal, which forms a silicide with the silicon. Preferably, the present eutectiferous silicon-rich alloy is comprised of silicon and a metal selected from the group consisting of cobalt(Co), chromium (Cr), iron(Fe), hafnium(Hf), manganese(Mn), molybdenum(Mo), niobium(Nb), nickel(Ni), palladium(Pd), platinum(Pt), rhenium(Re), rhodium(Rh), ruthenium(Ru), tantalum(Ta), thorium (Th), titanium (Ti), uranium(U), vanadium(V), tungsten(W), yttrium(Y), zirconium (Zr) and mixtures thereof.

The present eutectiferous silicon-rich alloy is a solid at room temperature and contains silicon in an amount ranging from more than 50 atomic % up to about 99.0 atomic %. The specific composition of the present eutectiferous silicon-rich alloy depends largely upon the particular product desired, i.e. its particular composition. The present silicon-rich alloy is eutectiferous in that it contains some eutectic structure and can be of hypoeutectic, hypereutectic or of eutectic composition.

Figure 1:
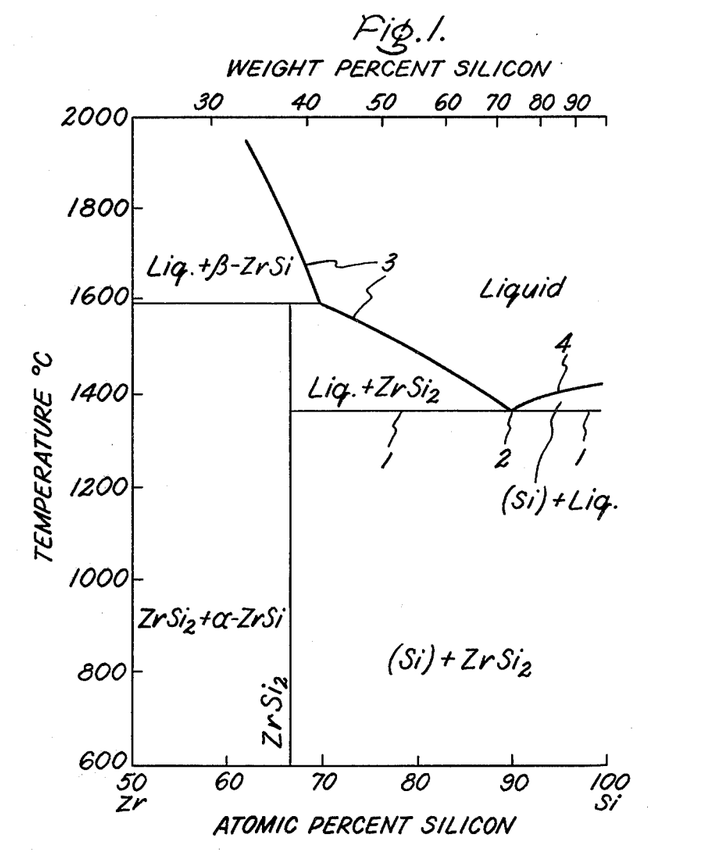
FIG. 1 is a portion of a silicon-zirconium alloy phase diagram showing the equilibrium diagram for eutectiferous silicon-rich zirconium alloy useful in the present invention.

Using FIG. 1 as an example, the eutectic (2) is an alloy of specific composition which, under equilibrium conditions, on cooling freezes at constant temperature forming a solid of at least two phases, and which on heating melts completely at the same constant temperature, this constant temperature being referred to as the eutectic temperature also given at (2). The eutectic (2) is the composition at which two descending liquidus curves (3) and (4), meet at eutectic point (2), and therefore, it has a lower melting point than its neighboring hypoeutectic or hypereutectic compositions. The liquidus is a curve or line on a phase diagram representing under equilibrium conditions the temperatures at which melting ends during heating of the silicon-rich alloy or freezing begins during cooling thereof. Specifically, the present eutectiferous silicon-rich alloy is one of the series of alloys on a eutectic horizontal (1), i.e. the horizontal passing through the eutectic point (2), and which extends from any alloy whose composition lies to the left of the eutectic (2) on an equilibrium diagram and which contains some eutectic structure, i.e. hypoeutectic, to any alloy whose composition lies to the right of the eutectic (2) on the equilibrium diagram and which contains some eutectic structure, ie. hypereutectic alloy.

In carrying out the present process, the desired composition of the present infiltrating eutectiferous silicon-rich alloy and its melting, i.e. liquidus, temperature are found as a point on the liquidus curves including the eutectic point on the phase diagram for the present silicon-rich alloy. The temperature used to carry out the present infiltration can range from the liquidus or melting temperature of the eutectiferous silicon-rich alloy up to about 1600° C. Temperatures higher than about 1600° C. are not useful since they tend to graphitize the diamonds significantly unless very high pressures are applied and provide no significant advantage. Since the present eutectiferous silicon-rich alloys are maintained under a pressure of at least 25 kilobars, the melting or liquidus temperature is somewhat lower than that at ambient pressure with the particular liquidus temperature being dependent on the particular composition of the alloy and the particular pressure being applied.

The present silicon-rich alloy of eutectic composition melts at a temperature below about 1430° C. at ambient pressure. For the preferred group of silicon-rich alloys herein, the eutectic melting point at ambient pressure ranges from 870° C. for SiPd eutectic alloy, i.e. about 56 atomic % Si, to 1410° C. for SiMo eutectic alloy composition, i.e. about 97 atomic % Si. As shown in FIG. 1, the SiZr eutectic alloy (2) contains 90.4 atomic % Si and has a eutectic melting temperature of 1360° C. at ambient pressure. The major phase of the present solid silicon-rich eutectic alloy is almost pure silicon.

The present eutectiferous silicon-rich alloy has a melting point below about 1500° C. at ambient pressure usually from about about 850° C. to about 1450° C. at ambient pressure.

The present eutectiferous silicon-rich alloy should be used in an amount sufficient to fill the voids of the compressed diamond mass herein having a density of crystals higher than 90% by volume. Generally, it ranges from about 20% to about 60% by volume of the present compressed mass of diamond crystals having a density of crystals higher than 90% by volume.

In forming the present charge, the mass of diamond crystals is placed in contact with the mass of eutectiferous silicon-rich alloy. Alternatively, the mass of diamond crystals can be in contact with at least one of the components used for forming the eutectiferous silicon-rich alloy in situ, i.e. silicon or alloying metal. The components for forming the alloy are positioned to form it before infiltration. To protect the contacting masses of diamond and alloy from the penetration of gases evolving during heating from the graphite heater and to help confine the alloy when it is molten, the contacting masses of diamond and alloy are positioned within a protective metallic shield such as a cup or container. The hexagonal boron nitride is a necessary ingredient of the present charge and is placed in contact or in association with the silicon-rich alloy or with one of its components. Specifically, the hexagonal boron nitride can be placed within the protecting metallic shield or cup in contact with the alloy, or it can be placed outside the protective metallic shield or cup but in contact with the external portion of the shield or cup being separated from the alloy or one of its components only by the thickness of the shield or cup.

It is believed that in the present invention, hexagonal boron nitride is an essential component which makes it possible for the alloy to infiltrate throughout the dense mass of diamond crystals. Specifically, without the hexagonal boron nitride, the present infiltration does not proceed. Also, with amounts of hexagonal boron nitride less than about 5% by weight of the diamond crystals, the infiltration proceeds to a limited extent producing a poorly bonded diamond compact which is weak and which fractures easily. With amounts of hexagonal boron nitride of at least about 5% by weight of the total amount of diamond crystals, and preferably higher, most preferably from about 15% to about 100% by weight of the diamond crystals, the present infiltration is carried out provided the hexagonal boron nitride is placed in contact or in close association with the present alloy. Specifically, when the hexagonal boron nitride is in contact with the alloy, or in association with it being separated from the alloy only by the thickness of the metallic shield, the present infiltration proceeds producing a useful well-bonded polycrystalline diamond body. The metallic shield or container need only be sufficiently thick to at least substantially maintain the molten or infiltrating alloy within the container and usually such thickness ranges up to about 2 mils.

The charge or charge assembly is placed within a reaction chamber of a high temperature-high pressure apparatus of the type used for synthesizing diamond by applications of high temperatures and pressures. One preferred form of a high pressure, high temperature apparatus in which the product of the instant invention may be prepared is disclosed in U.S. Pat. No. 2,941,248—Hall (incorporated by reference) and is briefly illustrated in FIG. 2.

Figure 2:
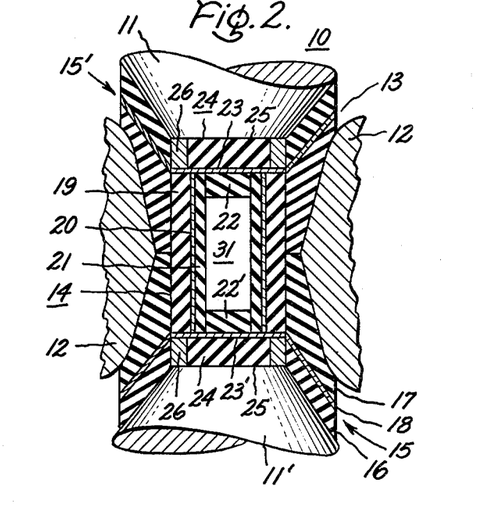
FIG. 2 illustrates one exemplary high pressure, high temperature apparatus useful in the preparation of the product of this invention.

In FIG. 2, apparatus 10 includes a pair of cemented tungsten carbide punches 11 and 11' and an intermediate belt or die member 12 of the same material. Die member 12 includes an aperture 13 in which there is positioned a reaction vessel 14. Between punch 11 and die 12 and between punch 11' and die 12 there are included gasket-/insulating assemblies 15,15', each comprising a pair of thermally insulating and electrically non-conducting pyrophyllite members 16 and 17 and an intermediate metallic gasket 18.

Reaction vessel 14 in one preferred form, includes a hollow salt cylinder 19. Cylinder 19 may be of other materials, such as talc. Positioned concentrically within and adjacent cylinder 19 is a graphite electrical resistance heater tube 20. Within graphite heater tube 20 there is in turn concentrically positioned the cylindrical salt liner 21. The opposite ends of liner 21 are fitted with salt plugs 22,22', disposed above and below, respectively, the charge assembly (not shown in FIG. 2) to be described hereinbelow. Electrically conductive metal end discs 23 and 23' are utilized at each end of cylinder 19 to provide electrical connection to graphite heater tube 20. Adjacent to each disc 23,23' is an end assembly 24 and 24' each comprising a pyrophyllite plug or disc 25 surrounded by an electrical conducting ring 26.

Operational techniques for applying both high pressures and high temperatures in this apparatus are well known to those skilled in the art. The foregoing description relates to merely one high pressure, high temperature apparatus. Various other apparatuses are capable of providing the required pressures and temperatures that may be employed within the scope of this invention.

Figure 3:
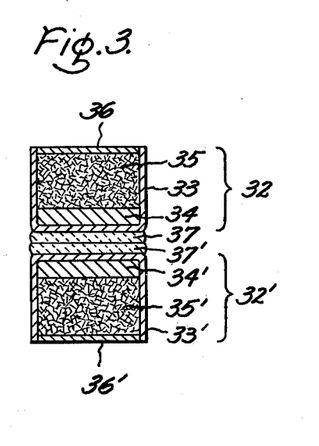
FIG. 3 is a cross-sectional view of one embodiment of the present confined charge for the reaction chamber of FIG. 2.
Figure 4:
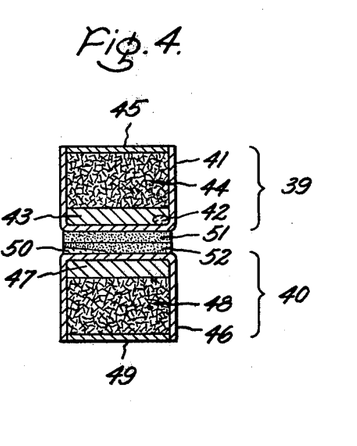
FIG. 4 is a cross-sectional view of another embodiment of the present confined charge for the reaction chamber of FIG. 2.

Embodiments of the present charge or charge assemblies are shown in FIGS. 3 and 4. The charge assembly of FIG. 3 or of FIG. 4, although not illustrated in proportion, fits within space 31, i.e. the reaction chamber, of the apparatus of FIG. 2. The charge assembly should form a close fit within the reaction chamber so that on application of pressure the confined masses will not be repositioned significantly, i.e. so that the shape or configuration of the confined masses will not be changed significantly.

In the arrangement shown in FIG. 3, the charge assembly is composed of two charges or sub-assemblies 32 and 32' which are the same. Within metallic cup 33 or 33' (right circular cylindrical wall with bottom) are disposed a layer or disc 34 or 34' of eutectiferous silicon-rich alloy, a mass 35 or 35' of diamond crystals in contact with alloy 34 or 34' and a disc 36 or 36' fitting closely into cup 33 or 33' and acting as a closure therefor. A disc of hexagonal boron nitride 37 or 37' is positioned outside each protective metallic cup 33 or 33' in contact therewith and separated from alloy 34 or 34' only by the thickness of metallic cup 33 or 33'. A thermocouple (not shown) is preferably placed between 37 and 37'.

Cup 33 or 33' and disc 36 or 36' are made of a metallic material which has no significant deleterious effect on the properties of the present diamond body. Such a metallic material preferably is a metal selected from the group consisting of tungsten, yttrium, vanadium, tantalum, molybdenum and zirconium.

No free space should be left within the container or cup which would allow an intermixing or free movement of the contents therein so that the contents, at least substantially as initially positioned, are subjected to the present pressure. The container, i.e. cup 33 or 33' and disc 36 or 36' need only have a thickness sufficient to at least substantially maintain the infiltrating silicon-rich alloy within the container.

Another embodiment of the present charge assembly is shown in FIG. 4 where in one sub-assembly or charge 39 there is positioned within metallic cup 41, a mass of hexagonal boron nitride 42, a disc of eutectiferous silicon-rich alloy 43, and a mass of diamond crystals 44 with disc 45 being a closure therefor. As shown by sub-assembly 40 in FIG. 4, there is positioned within metallic cup 46 a layer of eutectiferous silicon-rich alloy 47, and a layer of diamond crystal 48 with disc 49 being a closure therefor and a mass of hexagonal boron nitride 50 is positioned just outside metallic cup 46 in contact therewith and in association with alloy 47. In addition, the two sub-assemblies are separated by salt discs 51 and 52, and a thermocouple (not shown) is preferably placed between these salt discs.

At room or ambient temperature, a pressure ranging from about 25 kilobars to about 60 kilobars is applied to the charge assembly within the reaction chamber. This applied pressure dimensionally stabilizes the charge assembly or additionally dimensionally stabilizes it, and compresses the mass of diamond crystals to a density higher than 90% by volume of the compressed diamond mass. Specifically, the applied pressure diminishes the size of the voids to maximize the presence of capillary-size voids in the diamond mass, and this reduction in void volume provides more juxtaposed crystal-to-crystal areas properly located for effective bonding together. An applied pressure significantly below 25 kilobars will not compress the mass of diamond crystals to a diamond density higher than 90% by volume. The particular pressure to be applied for control of density is determined largely by the diamond density desired and the size of the diamond crystals, and to maintain diamond stability at temperature. For a mass of diamond crystals having a particular size or mixture of sizes, the pressure to be applied to attain a particular diamond density in the product is determinable empirically, i.e. the higher the applied pressure the higher the diamond density in the compressed mass of diamond crystals. Also, the higher the density of the crystals, the less will be the amount of non-diamond material present between the crystals resulting in a proportionately harder abrasive body. However, an applied pressure higher than 60 kilobars provides no significant advantage. For best results, the applied pressure ranges from about 45 kilobars to about 55 kilobars.

The dimensionally stabilized charge or charge assembly is maintained under the applied pressure of at least about 25 kilobars and heated to the infiltration temperature, i.e., a temperature at least sufficient to melt the eutectiferous silicon-rich alloy, and on melting, it is forced throughout the interstices or voids of the compressed mass of diamond crystals.

In carrying out the infiltration, initially, when the alloy is melted, any slag or oxide which might form or be present therein floats therein and is left behind when it infiltrates the compressed diamond mass. Also, application of the pressure to the alloy breaks up interfacial refractory layer or slag, largely oxide, which usually is present or which forms between the alloy and diamond surfaces exposing the capillary void system to the alloy. As a result, the present polycrystalline diamond body is free of glassy phase which would prevent a strong bond from forming between the diamond and the bonding medium.

Figure 5:
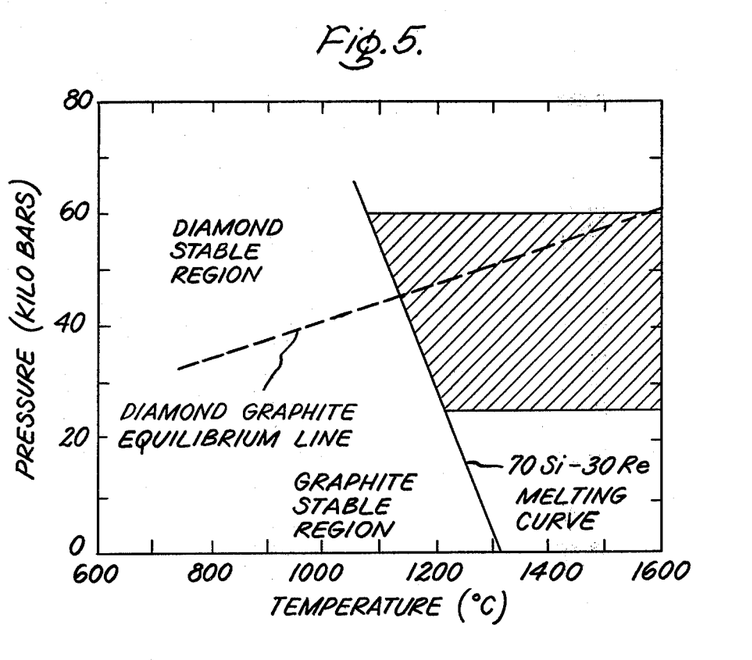
FIG. 5 shows the melting curve of a silicon-rich rhenium alloy as a function of pressure and the shaded area defines the operable combinations of pressure and temperature for carrying out the present process with such alloy.

As shown by FIG. 5, the melting point of 70 wt% silicon—30 wt% rhenium is about 1310° C. However, under the applied superpressure of the present process, FIG. 5 shows that this alloy melts at a temperature substantially lower than at standard pressure, i.e. under a pressure of 60 kilobars, it will melt at a temperature of about 1080° C., and under a pressure of 25 kilobars, it will melt at a temperature of about 1210° C. The shaded area in FIG. 5 defines the operable combinations of temperature and pressure for carrying out the present infiltration with this 70 wt% silicon—30 wt% rhenium alloy.

After the reaction vessel is assembled and introduced into the high pressure-high temperature apparatus within the gasket/insulation assemblies, the pressure is raised first and then the temperature. The infiltration temperature should be reached quickly, preferably in less than 5 minutes, particularly in the graphite stable region, to minimize conversion of diamond to non-diamond elemental carbon, and held at such temperature under the applied pressure usually for at least about two minutes to insure satisfactory infiltration throughout the diamond crystal mass. Generally, an infiltration time period ranging from about 2 minutes to about 10 minutes is satisfactory.

In the present process the conversion of diamond to a non-diamond form, i.e. silicon carbide, non-diamond elemental carbon or both, depends largely on time and temperature, i.e. the higher the temperature and the longer the time at such temperature the more likely the conversion of diamond to non-diamond form, and the extent of such conversion is determinable empirically. Specifically, above the diamond-graphite equilibrium line in the shaded area of FIG. 5, the conversion of diamond proceeds largely by the reaction of the alloy with the diamond surfaces and in such instance the present process should be completed before sufficient diamond has converted to non-diamond form which would decrease the diamond content of the recovered polycrystalline diamond body to less than 90% by volume of the body. On the other hand below the diamond-graphite equilibrium line in the shaded area of FIG. 5, the conversion of diamond to non-diamond form is likely to proceed largely by the conversion of diamond to non-diamond elemental carbon, i.e. graphite, and again, in such instance the present process should be completed before sufficient diamond has converted to non-diamond form which would decrease the diamond content of the recovered polycrystalline diamond body to less than 90% by volume of the body.

During infiltration, as the alloy infiltrates and flows through the diamond mass, it encapsulates the surfaces of the compressed diamond crystals reacting with the diamond surfaces or any non-diamond elemental carbon phase which may form, to produce a carbide which at least in major amount and usually in substantial amount is silicon carbide. The resulting product is an integral strongly-bonded polycrystalline diamond body.

When the infiltration is completed, heat input to the reaction chamber is ceased before the pressure is removed to prevent graphitization of the diamond and to preserve the dimensional stability of the infiltrated diamond mass. Specifically, when infiltration is completed, the electrical power to the graphite heater is shut-off and the reaction chamber cools to about room temperature quickly, usually in about 1 minute. Generally, when the reaction chamber has cooled to below 50° C., the pressure is then released, preferably at a rate of about 10 kilobars per minute to atmospheric pressure. Preferably, the infiltrated diamond mass is allowed to cool to room temperature before it is recovered. Any squeezed out excess silicon alloy at the outside surfaces of the polycrystalline diamond body can be removed by conventional techniques such as grinding.

The present polycrystalline diamond body is comprised of a mass of diamond crystals adherently bonded to each other by a silicon atom-containing bonding medium, said diamond crystals ranging in size from about 1 micron to about 1000 microns, the density of said diamond crystals ranging from at least 90% by volume up to about 95%, said silicon atom-containing bonding medium being present in an amount ranging up to about 10% by volume of said body, said bonding medium being distributed at least substantially uniformly throughout the polycrystalline diamond body, the portion or surface of said bonding medium in contact with the surfaces of the bonded diamonds being at least in major amount silicon carbide, i.e. more than 50% by volume of the portion or surface of the bonding medium in direct contact with the surfaces of the diamond crystals is silicon carbide. Preferably, the portion or surface of said bonding medium in contact with the surfaces of the bonded diamonds is at least in substantial amount silicon carbide, i.e. at least about 85% by volume and preferably 100% by volume of the bonding medium in direct contact with the surfaces of the bonded diamond crystals is silicon carbide. The present diamond body is pore-free or at least substantially pore-free.

The present silicon atom-containing bonding medium always contains silicon carbide. In one embodiment the present bonding medium is comprised of silicon carbide and metal silicide. In another embodiment the present bonding medium is comprised of silicon carbide, metal silicide and elemental silicon. In yet another embodiment, the present bonding medium is comprised of silicon carbide, metal silicide and metal carbide. In yet another embodiment, the present bonding medium is comprised of silicon carbide, metal silicide, metal carbide and elemental silicon. In still another embodiment, the present bonding medium is comprised of silicon carbide, metal carbide and elemental silicon. The metal components of the metal silicide and metal carbide in the present bonding medium are produced by the alloying metal or metals present in the infiltrating alloy.

The metal component of the metal silicide present in the bonding medium is preferably selected from the group consisting of cobalt, chromium, iron, hafnium, manganese, rhenium, rhodium, ruthenium, tantalum, thorium, titanium, uranium, vanadium, tungsten, yttrium, zirconium and alloys thereof.

The metal component of the metal carbide present in the bonding medium is a strong carbide former which forms a stable carbide and is preferably selected from the group consisting of chromium, hafnium, titanium, zirconium, tantalum, vanadium, tungsten, molybdenum and alloys thereof.

The amount of elemental silicon, if any, and silicon carbide in the bonding medium of the present diamond body can vary depending on the extent of the reaction between the surfaces of the diamond crystals and the infiltrating silicon-rich alloy as well as the reaction between non-diamond elemental carbon and infiltrating silicon-rich alloy. Assuming all other factors are equal, the particular amount of silicon carbide present in the bonding medium depends largely on the particular combination of applied pressure and temperature used and the time period at such pressure-temperature combination. The production of the present body of bonded diamond crystals with a particular desired amount of silicon carbide to attain certain desirable properties, for example, is determinable empirically.

Specifically, the bonding medium will always contain at least a detectable amount of silicon carbide and at least a detectable amount of a silicide and/or carbide of the alloying metal present in the infiltrating alloy. The metal silicide is usually in the form of a disilicide depending upon the particular infiltrating alloy used. The bonding medium may also contain at least a detectable amount of elemental silicon. By a detectable amount of silicon carbide, metal silicide, metal carbide or elemental silicon it is meant herein an amount detectable by selective area diffraction analysis of transmission electron microscopy on a thin section of the present body. Generally, however, the present bonding medium contains silicon carbide in an amount of at least about 1% by volume of the present polycrystalline diamond body and usually metal silicide in at least a detectable amount, and frequently in a minimum amount of about 0.1% by volume of the polycrystalline diamond body. The particular amount of metal silicide present depends largely on the composition of the infiltrating silicon-rich alloy. The metal silicides are hard and some are reported to have lower linear thermal expansion coefficients than the metals, or in some instances lower than diamond, as for example rhenium, a desirable property for a phase in a diamond body. The particular amount of silicon carbide and elemental silicon present depends largely on the composition of the infiltrating silicon-rich alloy as well as on the extent of the reaction between the infiltrating silicon-rich alloy and diamond or non-diamond carbon. The particular amount of metal carbide present depends largely on the composition of the infiltrating silicon-rich alloy.

Selective area diffraction analysis of transmission electron microscopy on a thin section of the present polycrystalline diamond body will also show that the portion of the bonding medium in contact with the surfaces of the bonded diamonds is at least in major amount silicon carbide.

The present body of bonded diamond crystals is void or pore-free or at least substantially pore-free, i.e. it may contain voids or pores in an amount less than about 2% by volume but usually less than about 1% by volume of the diamond body providing such voids or pores are small, less than about 0.5 micron, and sufficiently uniformly distributed throughout the body so that they have no significant deleterious effect on its mechanical properties. The void or pore contact of the present body is determinable by standard metallographic techniques such as, for example, optically examining a polished cross-section of the body.

The present diamond body also is free of non-diamond carbon phase in that it does not contain non-diamond elemental carbon phase in an amount detectable by X-ray diffraction analysis.

The present polycrystalline diamond body can range in size. Its maximum size is limited by the capacity of the equipment. On the other hand, the present polycrystalline diamond body can be as small or as thin as desired, however, it will always be in excess of a monolayer of diamond crystals.

For use as an abrasive, a portion of the present diamond body can be soldered, brazed or otherwise adhered to a suitable support material such as sintered or hot-pressed silicon carbide, sintered or hot-pressed silicon nitride, or a cemented carbide, or a metal such as molybdenum forming a tool insert which, for example, can be held by a tool shank adapted to be held in a machine tool whereby the exposed surface of the diamond body can be used for direct machining. Alternatively, the present polycrystalline diamond body can be mechanically clamped to a lathe tool for direct machining by the exposed surface of the diamond body.

The invention is further illustrated by the following tabulated runs where, unless otherwise stated, the procedure was as follows:

Hexagonal boron nitride powder of fine particle size, e.g. ranging in size from about 2 microns to about 20 microns, was used.

The equipment used was substantially the same as that shown in FIG. 2.

The amount of infiltrating alloy was sufficient to completely infiltrate through the compressed diamond mass.

The infiltrating alloy was a eutectiferous silicon-rich alloy containing more than 50 atomic % of silicon.

The polycrystalline diamond body was produced in the form of a disc.

A zirconium cup, with a thickness of about 1 mil, was used in each run. A cast disc of the particular silicon-rich alloy was placed within the cup, a layer of the diamond powder was place on top of the alloy and the cup was then closed with a zirconium disc, also about 1 mil thick, leaving no significant free space within the cup.

Runs 1-10 formed charge assemblies substantially as shown by FIG. 3 or 4. Each of the charges of runs 11, 12 and 13 were substantially similar to charges 32 or 40 of FIG. 3 or 4 except as noted and formed charge assemblies with means which were used to calibrate temperature and pressure conditions. The charges of Runs 14-25 were substantially the same as charge 32 but an HBN disc was used as an end plug against closure disc 36 and a compacted layer of HBN powder encapsulated the charge.

The charge or charge assemblies were inserted and centrally positioned in the reaction chamber, i.e. cavity of a reaction vessel of substantially the same type as shown by 14 of FIG. 2. Specifically, the charge assemblies of runs 1-13 were inserted using a salt sleeve such as 21 of FIG. 2, but in runs 14-25 no salt sleeve was used since a large amount of hexagonal boron nitride encapsulated each charge. The inner diameter of the reaction chamber was almost the same as the diameter of the charge or charge assembly. Salt plugs 22 and 22' were used, and when necessary, pressed salt cylinders were placed below and on top of the charge or charge assembly to fill in the remaining space of the chamber. The reaction vessel was placed in a high pressure-high temperature apparatus substantially the same as that shown in FIG. 2 and at ambient temperature was pressed to about 55 kilobars. This produced a compressed mass of diamonds containing a volume fraction of diamonds in excess of 90%. When the pressure became substantially stabilized, electric current was applied through the graphite heating element of the reaction vessel to produce the given temperatures for the given time period. Where two temperatures are given for a run, the higher temperature is the infiltration temperature. The power was then turned off, and after the reaction vessel cooled to about room temperature, the pressure was released and the reaction vessel was removed from the apparatus.

"Pliers" test was used for a quick evaluation of the strength of the polycrystalline diamond disc produced. The disc was hand held between the jaws of two pliers for a crude bend test. An improperly infiltrated disc could be broken fairly easily but a well-infiltrated well-bonded disc could not.

For wear rate an edge of polycrystalline diamond disc was evaluated on a lathe turning of Barre Granite with a depth of cut 0.020" and a cutting speed of 600 surface feet per minute for 1 minute using a water soluble coolant.

The Abrasion Resistance Factor (ARF) is a measurement on the ability of a cutting tool material to withstand wear. This factor is defined as the time, in minutes, required to produce a 0.010 inch wearland, i.e. amount worn away, on the tool material when turning Ebonite Black Diamond, a siliceous sand filled rubber. ARF=T(minutes)/100 Wearland (inch)

X-ray diffraction analysis was that of the polished face of the disc.

| Run No. | In-house Run No. | Infiltrating Alloy wt. % | Amt. (gm) | Thickness (in) | Diamond Powder size (micron) | amt. (gm) | Hexagonal Boron Nitride amt. (gm) | Form & Location | Temp °C. | Time at Temp °C. | Polycrystalline Diamond Body |
|---|---|---|---|---|---|---|---|---|---|---|---|
| 1 | 718T | 70Si 30Re | 0.175 | 0.035 | 4–8μ(20wt%) 0–60μ(80wt%) | 0.750 | ~0.5 (includes 718B) | hot-pressed HBN disc used as end plug against 36 and HBN disc 37 as in FIG. 3 | ~1050 ~1475 | 20 5 | completely infiltrated & well-bonded ~0.150" thick & 0.350" diameter disc ARF = 116 |
| 2 | 718B | 70Si 30Re | " | " | 0–50μ of which 85wt% were 10–40μ | " | | hot-pressed HBN disc used as end plug against 36' and HBN disc 37' as in FIG. 3 forming charge assembly with 718T | Same as 718T | | completely infiltrated & well-bonded |
| 3 | 725T | 70Si 30Re | 0.136 | 0.030 | Same as 718B | 0.500 | | Same as 718T | ~1050 ~1450 | 2 6 | completely infiltrated & well-bonded ~0.125" thick & 0.350" diameter disc wear rate 28 × 10$^{-7}$ in$^3$/min |
| 4 | 725B | 70Si 30Re | " | " | " | " | | Same as 718B & forming charge assembly with 725T as in FIG. 3 | Same as 725T | | completely infiltrated & well-bonded ~0.125" thick & 0.350" diameter disc wear rate 27 × 10$^{-7}$ in$^3$/min |
| 5 | 728T | 70Si 30Re | 0.105 | 0.020 | Same as 718B | 0.500 | | Same as 718T | ~1050 ~1475 | 10 6 | completely infiltrated & well-bonded ~0.125" thick & 0.350" diameter wear rate 25 × 10$^{-7}$ in$^3$/min |
| 6 | 728B | 70Si 30Re | " | " | " | " | | Same as 718B & forming charge assembly with 728T as in FIG. 3 | Same as 728T | | completely infiltrated & well-bonded ~0.125" thick & 0.350" diameter wear rate 37 × 10$^{-7}$ in$^3$/min |
| 7 | 280T | 70Si 30Re | 0.055 | 0.010 | " | 0.300 | 0.010 | HBN powder as layer between cup 41 and alloy 43 as in FIG. 4 with salt plug against 45 | 1425 | 5 | broke in pliers test, some infiltration of alloy thru diamond insufficient HBN (abt. 3% by wt of diamond) |
| 8 | 280B | 70Si 30Re | 0.052 | " | " | " | 0.030 | HBN powder but as layer between cup and alloy with salt plug against 49 forming charge assembly with 280T separated therefrom by two salt discs | Same as 280T | | good infiltration thru diamond could not be broken in pliers test HBN abt 10% by wt of diamond |
| 9 | 249T | 70Si 30Re | 0.160 | 0.030 | Same as 718B | 0.300 | | a few mg(<10) of HBN powder as pile 42 between cup 41 and alloy 43 as in FIG. 4 with salt plug against 45 and salt spacer 51 | 1460 | 5 | some infiltration of alloy but bonding not good; broke easily in pliers test insufficient HBN (less than 5% by wt. of diamond) |
| 10 | 249B | 70Si 30Re | 0.180 | 0.040 | " | 0.300 | | few mg (<10) of HBN powder as pile 50 between cup 46 & salt spacer 52 as in FIG. 4 with salt plug against 49 forming charge assembly with 249T | Same as 249T | | same as 249T insufficient HBN (less than 5% by wt. of diamond) |
| 11 | 246T | 70Si 30Re | 0.062 | 0.012 | " (two layers of 0.150g separated | 0.300 | | hot-pressed HBN disc as end plug against 36 | ~1475 | 6 | well infiltrated & well-bonded could not be broken in pliers test. HBN more than 15% |

-continued

Figure 6:
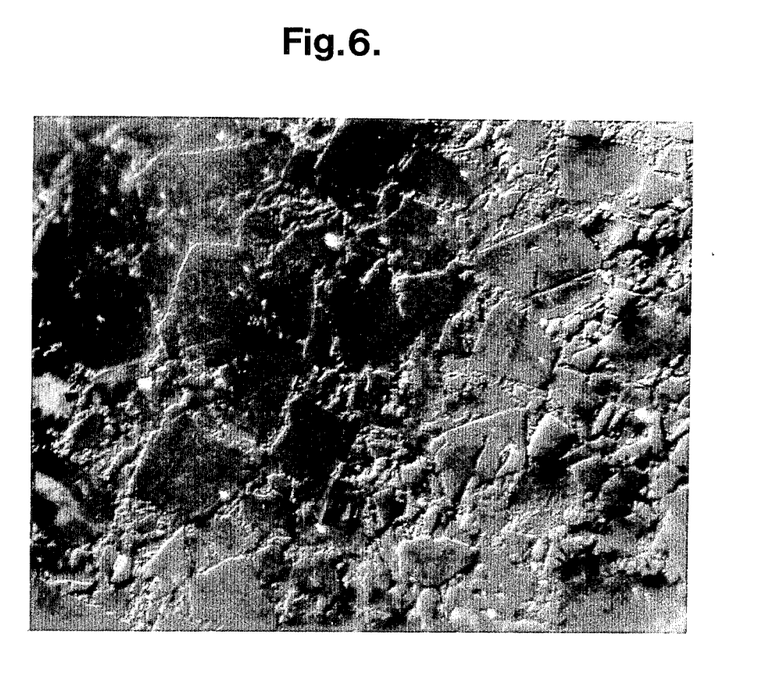
FIG. 6 is a photomicrograph (magnified 750×) of a polished transverse section of a diamond body prepared by the present process wherein the diamond content was 92.2% by volume of the body.

| Run No. | In-house Run No. | Infiltrating Alloy wt. % | Amt. (gm) | Thickness (in) | Diamond Powder size (micron) | amt. (gm) | Hexagonal Boron Nitride amt. (gm) | Form & Location | Temp °C. | Time at Temp °C. | Polycrystalline Diamond Body |
|---|---|---|---|---|---|---|---|---|---|---|---|
| | | | | | by 70Si 30Re alloy layer) | | | and HBN disc 37 as in FIG. 3 | | | by wt. of diamond. |
| 12 | 247T | 70Si 30Re | 0.082 | 0.015 | Same as 718B (two layers of 0.150g separated by 70Si 30Re alloy layer) | 0.300 | | no HBN in system salt plug against 45 and salt spacers | ~1480 | 5 | no bonding and no wetting of diamond by alloy |
| 13 | 248T | 70Si 30Re | 0.159 | 0.030 | Same as 718B | 0.300 | | small patch of HBN (a few mg) between alloy and diamond powder) salt plug against 45 and salt spacers | ~1460 | 5 | no infiltration of alloy into diamond insufficient HBN (less than 5% by wt. of diamond) |
| 14 | 682 | 70Si 30Re | 0.050 | 0.012 | Same 718T | 0.300 | ~0.400 | hot pressed HBN end plug against 36. Charge of 36, 35, 33 & 34 then surrounded by HBN powder, cold pressed under 25,000 psi & resulting HBN encapsulated charge placed in reactor | ~1050 ~1450 | 30 5 | crack free, ARF = 116. after heating in $H_2$ at 1050° C. for 30 min. ARF = 118. after heating in air at 1050° C. for 30 min. ARF = 103. |
| 15 | 694 | 90Si 10Fe | | 0.010 | Same as 718T | 0.300 | ~0.400 | Same as 682 | ~1050 ~1475 | 20 5 | ARF = 127. after heating in $H_2$ at 1050° C. for 30 min. ARF = 132. X-ray diffraction analysis showed diamond & $\beta$SiC with trace of $FeSi_2$ and FeSi |
| 16 | 684 | 95Si 5Co | | 0.010 | Same as 718T | 0.300 | ~0.400 | Same as 682 | ~1050 ~1475 | 20 5 | ARF = 116 |
| 17 | 685 | 75Si 25Cr | | 0.012 | Same as 718T | 0.300 | ~0.400 | Same as 682 | ~1050 ~1475 | 20 9 | ARF = 132. after heating in $H_2$ at 1050° C. for 30 min. ARF = 132 |
| 18 | 686 | 78Si 22Ti | | 0.011 | Same as 718T | 0.300 | ~0.400 | Same as 682 | ~1050 ~1475 | 20 5 | ARF = 103 X-ray diffraction analysis showed diamond & $\beta$SiC |
| 19 | 687 | 50Si 50Rh | | 0.010 | Same as 718T | 0.300 | ~0.400 | Same as 682 | ~1050 ~1475 | 20 5 | ARF = 132 after heating in $H_2$ at 1050° C. for 30 min. ARF = 132 X-ray diffraction analysis showed diamond & $\beta$SiC with trace of RhSi |
| 20 | 689 | 93Si 7Ge | | 0.010 | Same as 718T | 0.300 | ~0.400 | Same as 682 | ~1050 ~1475 | 20 5 | ARF = 116. after heating in $H_2$ at 1050° C. for 30 min. ARF = 116 |
| 21 | 688 | 60Si 40Ta | | 0.014 | Same as 718T | 0.300 | ~0.400 | Same as 682 | ~1050 ~1475 | 20 5 | ARF = 132 X-ray diffraction analysis showed diamond & $\beta$SiC, trace of $ZrSi_2$ |
| 22 | 696 | 94Si 6W | | 0.020 | Same as 718T | 0.300 | ~0.400 | Same as 682 | ~1050 ~1475 | 20 5 | fractured throughout most of layer but well infiltrated. Also well-bonded in some portions. |
| 23 | 690 | 70Si 30Ru | 0.053 | 0.011 | Same as 718T | 0.300 | ~0.400 | Same as 682 | ~1050 ~1475 | 30 5 | ARF — 118. after heating in $H_2$ at 1050° C. for 30 min. ARF = 122 |
| 24 | 695 | 90Si 10Pt | | 0.010 | Same as 718T | 0.300 | ~0.400 | Same as 682 | ~1050 ~1500 | 20 5 | well infiltrated & well-bonded could not be broken by pliers test |
| 25 | 646 | 70Si 30Re | | | Same as 718T | 0.240 | ~0.400 | Same as 682 | 1220 | 6 | well infiltrated and well bonded polished cross-section is shown in FIG. 6 diamond content was 92.2% by volume of the body |

Runs 1-6, 8, 11 and 14-25 illustrate the present invention, and in all of these runs hexagonal boron nitride was used in an amount in excess of 5% by weight of the total weight of diamond. In each of these runs, the volume fraction of diamond was at least 90% by volume of the disc, and except for Run 25, this was based on experience, results with similar runs, and the appearance of the polycrystalline diamond body on the assumption that less than 5% by volume of the diamond powder had converted to non-diamond elemental carbon phase. In Run 25, diamond density, i.e. volume fraction, was determined by the standard point count technique using a photomicrograph of the polished transverse section of the polycrystalline diamond body magnified 750 times and the surface area analyzed was sufficiently large to represent the microstructure of the entire body. The polished transverse section or surface showed it to be free of pores and free of elemental non-diamond carbon.

Abrasion Resistance Factor (ARF) values attained for the present polycrystalline diamond body in Runs 1, 14–21 and 23, show that the present product is highly abrasion resistant, particularly when compared to natural diamond (single crystal) which has an ARF ranging from 95–245, depending on the orientation of the crystal, and when compared to hot pressed polycrystalline silicon carbide (about 98% density) which has an ARF of 5. Also, the ARF data illustrates the good thermal stability of the present product, i.e. it is not degraded by heat.

The following patents, assigned to the assignee hereof, are incorporated herein by reference:

U.S. Pat. No. 4,124,401 to Lee et al discloses a polycrystalline diamond body, wherein the density of diamond crystal is less than 90% by volume of said body, which is formed by subjecting a mass of diamond crystals in contact with a mass of silicon-rich eutectiferous alloy to substantially isostatic pressure to dimensionally stabilize them, and hot-pressing the resulting system to infiltrate the alloy through the diamond mass.

U.S. Pat. No. 4,151,686 to Lee et al discloses a polycrystalline diamond body formed by confining a mass of diamond crystals in contact with a mass of elemental silicon within a pressure-transmitting medium, applying a pressure of at least 25 kilobars to the resulting charge, and then heating to melt and infiltrate the silicon through the diamond mass.

What is claimed is:

1. A process for preparing a polycrystalline diamond body which consists essentially of confining within a reaction chamber a charge composed of solid eutectiferous silicon-rich alloy, or solid components for providing eutectiferous silicon-rich alloy, and a mass of diamond crystals in contact with said mass of solid eutectiferous silicon-rich alloy, or with at least one of said components for providing eutectiferous silicon-rich alloy, and hexagonal boron nitride in contact or in association with said alloy or with at least one of its components, said eutectiferous silicon-rich alloy consists essentially of silicon and a metal which forms a silicide with said silicon and which is selected from the group consisting of cobalt, chromium, iron, hafnium, manganese, molybdenum, niobium, nickel, palladium, platinum, rhenium, rhodium, ruthenium, tantalum, thorium, titanium, uranium, vanadium, tungsten, yttrium, zirconium and alloys thereof, said hexagonal boron nitride being present in an amount of at least about 5% by weight of the mass of diamonds, applying a pressure of at least about 25 kilobars to said confined charge compressing the mass of diamond crystals to a density higher than 90% by volume of the resulting compressed means of diamond crystals, maintaining said applied pressure, heating the pressure-maintained charge to an infiltration temperature sufficient to melt said alloy and at which no significant graphitization of the diamond occurs whereby said alloy is infiltrated through the interstices between said compressed means of diamond crystals, said alloy being used in an amount sufficient to fill the interstices of said compressed mass of diamond crystals, said infiltrating silicon-rich alloy encapsulating the surfaces of the compressed diamond crystals reacting with diamond surfaces or any non-diamond elemental carbon producing a carbide which at least in major amount is silicon carbide, ceasing the input of heat into the resulting infiltrated diamond mass, removing said pressure and recovering the resulting polycrystalline diamond body comprised of diamond crystals bonded together by a silicon atom-rich bonding medium wherein the diamond crystals are present in an amount ranging from at least 90% by volume up to about 95% by volume of the total volume of said body.

2. The process according to claim 1 wherein said infiltration temperature ranges from about 850° C. to about 1600° C.

3. The process according to claim 1 wherein said applied pressure ranges from 35 kilobars to 55 kilobars.

4. The process of claim 1 wherein said diamond crystals are size-graded ranging from about 1 micron to about 60 microns.

5. A polycrystalline diamond body consisting essentially of a mass of diamond crystals adherently bonded together by a bonding medium consisting essentially of silicon carbide and a carbide and/or silicide of a metal component which forms a silicide with silicon, said metal component of said metal silicide being selected from the group consisting of cobalt, chromium, iron, hafnium, manganese, molybdenum, niobium, nickel, palladium, platinum, rhenium, rhodium, ruthenium, tantalum, thorium, titanium, uranium, vanadium, tungsten, yttrium, zirconium and alloys thereof, said metal component of said metal carbide being selected from the group consisting of chromium, hafnium, titanium, zirconium, tantalum, vanadium, tungsten, molybdenum and alloys thereof, said diamond crystals ranging in size from about 1 micron to about 1000 microns, the volume of said diamond crystals ranging from at least 90% by volume up to about 95% by volume of said body, said bonding medium being present in an amount ranging up to about 10% by volume of said body, said bonding medium being distributed at least substantially uniformly throughout said body, the portion of said bonding medium in contact with the surfaces of said diamond crystals being at least in a major amount silicon carbide, said diamond body being at least substantially pore-free.

6. The polycrystalline diamond body according to claim 5 wherein said bonding medium also contains elemental silicon.

7. The polycrystalline diamond body according to claim 5 wherein said bonding medium consists essentially of silicon carbide and said metal silicide.

8. The polycrystalline diamond body according to claim 7 wherein said bonding medium contains elemental silicon.

9. The polycrystalline diamond body according to claim 5 wherein said bonding medium consists essentially of silicon carbide and said metal carbide.

10. The polycrystalline diamond body according to claim 9 wherein said bonding medium contains elemental silicon.

* * * * *